June 6, 1950 — S. BOWMAN — 2,510,618
CANNED FOOD COOKER REEL
Filed April 8, 1946

INVENTOR.
SAMUEL BOWMAN
BY A. B. Bowman
ATTORNEY

Patented June 6, 1950

2,510,618

UNITED STATES PATENT OFFICE 2,510,618

CANNED FOOD COOKER REEL

Samuel Bowman, Oakland, Calif.

Application April 8, 1946, Serial No. 660,567

5 Claims. (Cl. 99—365)

My invention relates to a canned food cooker reel, more particularly for use in conveying cans of food through a cooking tank, and the objects of my invention are:

First, to provide a canned food cooker reel of this class, which may be constructed of sheet metal, making possible the use of stainless steel or the like, which is more durable in the cooking tank;

Second, to provide a canned food cooker reel of this class, in which the reel is made of sheet metal, and may be inclosed so that it floats in the heated water in the cooking tank for partially supporting the load of cans in connection therewith;

Third, to provide a canned food cooker reel of this class, which is made of sheet metal and may be inclosed whereby the immersion thereof in the cooking tank displaces a considerable volume of water reducing the volume of water to be heated in order to provide proper heating of the cans of food passing through the cooker tank in connection with the reel;

Fourth, to provide a canned food cooker reel of this class which is made of sheet metal and is provided with internally braced structural sheet metal cones lending great strength to the reel;

Fifth, to provide a canned food cooker reel of this class, having smooth arcuate can receiving troughs which offer a minimum amount of resistance to the travel of cans of food therein;

Sixth, to provide a canned food cooker reel of this class which may be made of sheet metal and may be readily and easily fabricated therefrom; and, Seventh, to provide a canned food cooker reel of this class which is very simple and economical of construction, efficient in operation and which will not readily deteriorate or get out of order.

With these and other objects in view as will appear hereinafter, my invention consists of certain novel features of construction, combination and arrangement of parts and portions, as will be hereinafter described in detail, and particularly set forth in the appended claims.

Figure 1:
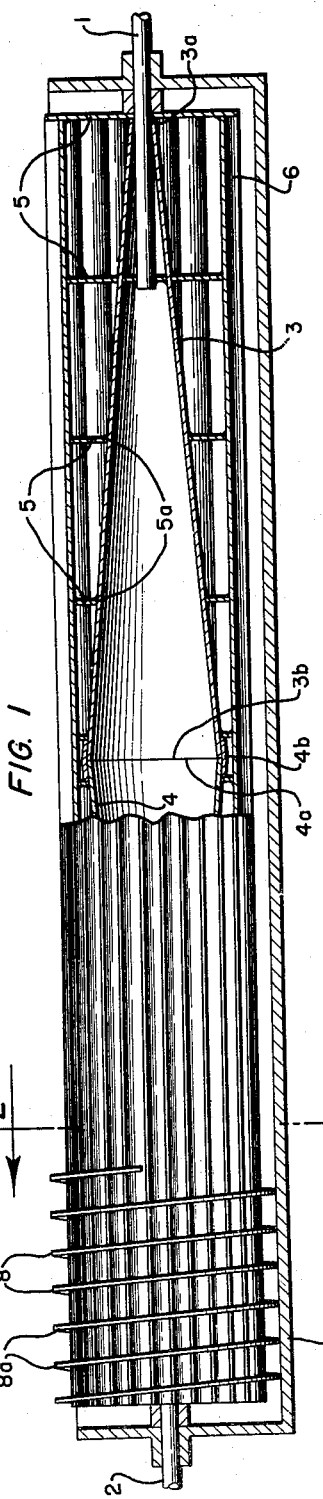
Figure 2:
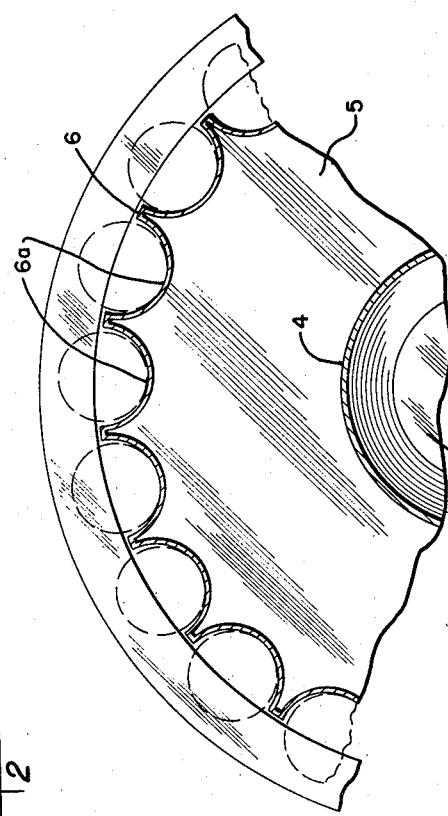

Reference being had to the accompanying drawings and to the characters of reference thereon, forming a part of this application in which: Figure 1 is a side elevational view of my canned food cooker reel showing portions thereof broken away and in section to amplify the illustration and showing said reel in a substantially conventional cooker tank together with a portion of a conventional helical can actuator; and Figure 2 is an enlarged fragmentary cross sectional view thereof showing a portion of the helical can actuator relatively thereto.

Similar characters of reference refer to similar parts and portions throughout the several views of the drawing.

The reel axles 1 and 2, cones 3 and 4, plates 5 and the can trough member 6 constitute the principal parts and portions of my canned food cooker reel.

The reel axles 1 and 2 are journaled in opposite ends of a conventional cooker tank 7 as shown best in Figure 1 of the drawings. These reel axles 1 and 2 support opposite ends of my canned food cooker reel in the tank 7 and are substantially identical in structure.

It will be here noted that opposite ends of my canned food cooker reel from the middle portion thereof are substantially identical in structure, therefore, the structure described hereinafter in connection with the reel axles 1 readily applies to the structure of the opposite end of the reel connected to the reel axle 2. The plates 5, as shown in Figure 1 of the drawings, are each secured at their peripheral edges to the can trough member 6 and are each provided with an internal opening 5a surrounding the cone 3. It will be noted that these openings 5a vary in diameter according to the position thereof, with respect to the base of the cone 3. One plate 5 abuts the small end 3a of the cone 3 and supports the axle 1 adjacent the end of the cooker tank 7. The base portion 3b of the cone 3 is abutted and welded to the base 4a of the cone 4. The plates 5 support the cones 3 and 4 at opposite sides of the abutment thereof intermediate which the reinforcing band 4b surrounds the abutment area of the cones 3 and 4 at their bases 3b and 4a respectively. This band 4b is welded at opposite edges to the cones 3 and 4 for reinforcing the connection thereof. The can trough member 6 supported in connection with the cones 3 and 4 by the plates 5 is provided with a plurality of arcuate in cross section trough portions 6a about its periphery as shown best in Figure 2 of the drawings. The peripheral edges of the plates 5 conform to the arcuate shape of these trough portions 6a for properly supporting the same and are welded thereto. It will be here noted that the various structures of this reel may be perforated or it may be inclosed as desired, and sealed by welding in order to provide watertight construction throughout. The cones 3 and 4, plates 5 and the can trough member 6 are preferably made of stainless steel or other non-corrodible material in order to prolong the life of my canned food cooker reel. The sheet metal construction of my canned food cooker reel provides for the use of stainless steel sheet material whereby the fabrication thereof is greatly simplified.

The operation of my canned food cooker reel is substantially as follows: When cans are delivered to the trough portions 6a of my canned food cooker reel intermediate the helix portions 8a of the helical can actuator 8 my canned food cooker reel is rotated by suitable means in connection with either one of the axles 1 or 2 as desired. During rotation the cans pass along the trough portions 6a of the can trough member 6 with a minimum amount of longitudinal resistance, and weight of a large number of these cans is partially born by the buoyant characteristics of my canned food cooker reel in the heated liquid in the cooker tank 7, thus frictional load on the bearings of the axles 1 and 2 is reduced, also stress in the structure of my canned food cooker reel is reduced. Bending stresses in the reel created by loading and due to its extreme length in some installations are resisted by the cones 3 and plates 5 so that a longer cooking time may be attained with a given reel capacity. The displacement of heated liquid in the cooker tank 7 by my canned food cooker reel is advantageous due to the fact that a smaller volume of liquid must be heated in order to properly process the cans of food passing along the trough portions 6a of the can trough member 6 during rotation of my canned food cooker reel. It will be here noted that the structure of my canned food cooker reel may be perforated if desired, however, the buoyancy of the canned food cooker reel as hereinbefore described would be eliminated.

Though I have shown and described a particular construction, combination and arrangement of parts and portions, I do not wish to be limited to the particular construction, combination and arrangement, but desire to include in the scope of my invention the construction, combination and arrangement substantially as set forth in the appended claims.

Having thus described my invention, what I claim as new and desire to secure by Letters Patent is:

1. A canned food cooker reel adapted to be positioned in a cooker tank having heated liquid therein, and constructed in watertight condition and arranged to displace liquid in said cooker tank creating buoyancy of said canned food cooker reel, said canned food cooker reel constructed of sheet metal, comprising axles for said canned food cooker reel at opposite ends thereof and cones having their apex portions in connection with said axles and abutted at their base portions substantially at the middle of said canned food cooker reel whereby bending stresses of the reel are resisted by said cones.

2. A canned food cooker reel adapted to be positioned in a cooker tank having heated liquid therein, and constructed in watertight condition and arranged to displace liquid in said cooker tank creating buoyancy of said canned food cooker reel, said canned food cooker reel constructed of sheet metal, comprising axles for said canned food cooker reel at opposite ends thereof and cones having their apex portions in connection with said axles and abutted at their base portions substantially at the middle of said canned food cooker reel whereby bending stresses of the reel are resisted by said cones, a plurality of plates having central openings therein positioned over said cones for maintaining the same concentric with the reel, a can trough member supported on the periphery of said plates outwardly of said cones and provided with a plurality of longitudinally disposed arcuate can trough portions.

3. In a canned food cooker reel of the class described, the combination with a cooker tank adapted to contain heated liquid therein of a rotatably mounted canned food cooker reel constructed of sheet metal and having integral recessed can trough portions at the periphery thereof extending longitudinally thereof.

4. In a canned food cooker reel of the class described, the combination with a cooker tank adapted to contain heated liquid therein of a rotatably mounted canned food cooker reel constructed of sheet metal and having can trough portions at the periphery thereof extending longitudinally thereof, a pair of axles in connection with opposite ends of said reel, internal cones having their apex portions adjacent said axles and having their base portions abutted at substantially the middle portion of said reel whereby bending stresses in the reel are resisted by said cones.

5. In a canned food cooker reel of the class described, the combination with a cooker tank adapted to contain heated liquid therein of a rotatably mounted canned food cooker reel constructed of sheet metal and having can trough portions at the periphery thereof extending longitudinally thereof, a pair of axles in connection with opposite ends of said reel, internal cones having their apex portions adjacent said axles and having their base portions abutted at substantially the middle portion of said reel whereby bending stresses in the reel are resisted by said cones and a plurality of plates having central openings therein positioned over said cones and engaging said can trough portions at the periphery thereof.

SAMUEL BOWMAN.

REFERENCES CITED

The following references are of record in the file of this patent:

UNITED STATES PATENTS

| Number | Name | Date |
|---|---|---|
| 1,939,372 | Thompson | Dec. 12, 1933 |
| 2,299,080 | DeBack | Oct. 20, 1942 |